(12) United States Patent
van Nunen et al.

(10) Patent No.: US 10,358,131 B2
(45) Date of Patent: Jul. 23, 2019

(54) VEHICLE SPACING CONTROL

(71) Applicant: Nederlandse Organisatie voor toegepast-natuurwetenschappelijk onderzoek TNO, 's-Gravenhage (NL)

(72) Inventors: Ellen van Nunen, 's-Gravenhage (NL); Leonardus Johannes Hubertus Maria Kester, 's-Gravenhage (NL); Jeroen Ploeg, 's-Gravenhage (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 355 days.

(21) Appl. No.: 14/441,702

(22) PCT Filed: Nov. 8, 2013

(86) PCT No.: PCT/NL2013/050806
§ 371 (c)(1),
(2) Date: May 8, 2015

(87) PCT Pub. No.: WO2014/073968
PCT Pub. Date: May 15, 2014

(65) Prior Publication Data
US 2015/0291162 A1    Oct. 15, 2015

(30) Foreign Application Priority Data

Nov. 9, 2012 (EP) ..................................... 12192083
Jan. 31, 2013 (EP) ..................................... 13153450

(51) Int. Cl.
*G06F 15/00*    (2006.01)
*G06F 17/18*    (2006.01)
(Continued)

(52) U.S. Cl.
CPC ............. *B60W 30/16* (2013.01); *G01B 21/16* (2013.01); *G01S 13/931* (2013.01); *G08G 1/166* (2013.01);
(Continued)

(58) Field of Classification Search
CPC ........... B60W 30/16; B60W 2550/306; B60W 2550/308; G01B 21/16; G01S 13/931;
(Continued)

(56) References Cited

U.S. PATENT DOCUMENTS 5,268,692 A    12/1993  Grosch et al.
5,706,909 A *  1/1998  Bevins .................... B60R 25/04
                                                          180/273
(Continued)

FOREIGN PATENT DOCUMENTS

EP    1273930 A1    1/2003
WO    2006/061342 A1    6/2006

OTHER PUBLICATIONS

Willem van Willigen, Evert Haasdijk and Leon Kester (2011). Evaluating Adaptive Cruise Control Strategies in Worst-Case Scenarios. In Proceedings of the 14th International IEEE Conference on Intelligent Transportation Systems, ITSC, 2011, Washington D.C., USA, Oct. 5-7, 2011, pp. 1910-1915, IEEE Press, Piscataway, NJ.
(Continued)

*Primary Examiner* — Ly D Pham
(74) *Attorney, Agent, or Firm* — Banner & Witcoff, Ltd.

(57) ABSTRACT

A method of determining a safe distance ($d_{safe}$) between a first vehicle (1) and a second vehicle (2) moving ahead of the first vehicle, each vehicle having a state which comprises at least one of a position ($s_1$, $s_2$), a speed and an acceleration of the respective vehicle, the method comprising the steps of: —collecting sensor data relating to the state of the vehicles (1, 2), —determining, using the sensor data and a
(Continued)

time-dependent description of the state of the second vehicle (2), a state of the second vehicle (2) as a result of a maximum deceleration of said second vehicle, —determining, using a time-dependent model of the behavior of the first vehicle (1) and said state of the second vehicle (2), a state of the first vehicle (1) as a result of said maximum deceleration of said second vehicle (2), and —determining, using said state of the second vehicle (2) and said state of the first vehicle (1), the safe distance ($d_{safe}$). Said state of the second vehicle (2) and said state of the first vehicle (1) involve uncertainties introduced by the sensor data, thus increasing the safety margin of the method.

20 Claims, 1 Drawing Sheet

(51) Int. Cl.
*G06F 17/00* (2019.01)
*G06F 7/00* (2006.01)
*G01B 21/16* (2006.01)
*B60W 30/16* (2012.01)
*B60W 40/105* (2012.01)
*G01S 13/93* (2006.01)
*G08G 1/16* (2006.01)

(52) U.S. Cl.
CPC . *B60W 2550/306* (2013.01); *B60W 2550/308* (2013.01); *G01S 2013/936* (2013.01); *G01S 2013/9321* (2013.01); *G01S 2013/9325* (2013.01); *G01S 2013/9353* (2013.01); *G01S 2013/9375* (2013.01)

(58) Field of Classification Search
CPC ..... G01S 2013/9321; G01S 2013/9325; G01S 2013/9353; G01S 2013/936; G01S 2013/9375; G08G 1/166
USPC .......................................................... 702/158
See application file for complete search history.

(56) References Cited

U.S. PATENT DOCUMENTS

| | | | |
|---|---|---|---|
| 5,818,355 A | 10/1998 | Shirai et al. | |
| 5,987,142 A * | 11/1999 | Courneau | H04S 3/004 381/17 |
| 6,114,957 A | 9/2000 | Westrick et al. | |
| 6,381,360 B1 * | 4/2002 | Sogawa | G06K 9/20 348/116 |
| 7,251,271 B1 * | 7/2007 | Eriksson | H03H 17/0294 375/229 |
| 9,645,579 B2 * | 5/2017 | Switkes | G08G 1/22 |
| 2007/0021876 A1 * | 1/2007 | Isaji | B60K 28/066 701/1 |
| 2007/0027583 A1 * | 2/2007 | Tamir | G06Q 30/0283 701/1 |
| 2009/0099715 A1 * | 4/2009 | Cho | B61H 9/00 701/20 |
| 2009/0256698 A1 * | 10/2009 | Bonilla | B60Q 1/44 340/479 |
| 2010/0079267 A1 * | 4/2010 | Lin | B60Q 9/008 340/435 |
| 2010/0168989 A1 * | 7/2010 | Gao | F02D 41/2422 701/110 |
| 2010/0209883 A1 * | 8/2010 | Chin | G09B 19/167 434/65 |
| 2012/0109421 A1 * | 5/2012 | Scarola | G08G 1/163 701/2 |
| 2013/0158820 A1 * | 6/2013 | Chiu | B60K 31/0008 701/51 |
| 2014/0032094 A1 * | 1/2014 | Heinrichs-Bartscher | B60T 7/22 701/301 |
| 2017/0146563 A1 * | 5/2017 | Braunberger | G01P 15/14 |

OTHER PUBLICATIONS

Willem van Willigen, Martijn C. Schut and Leon Kester (2011). Approximating Safe Spacing Policies for Adaptive Cruise Control Strategies. In Proceedings of the 2011 IEEE Vehicular Networking Conference, VNC, 2011, Amsterdam, The Netherlands, Nov. 14-16, 2011, pp. 9-16, IEEE Press, Piscataway, NJ.
"Fault Tolerancy in Cooperative Cruise Control" (Ellen van Nunen et al., Proceedings of the 16th Internalional IEEE Annual Conference on Intelligent Transportation Systems (ITSC 2013), The Hague, The Netherlands, Oct. 6-9, 2013).
"Safety in the Face of Uncertainty. Critical Headway Estimation in Cooperative Adaptive Cruise Control" (Willem van Willigen et al., Springer Science+Business Media New York, May 9, 2014).
International Search Report—PCT/NL2013/050806—dated May 19, 2014.
A. Lindgren and F. Chen: "State of the art analysis: An overview of advanced driver assistance systems (ADAS) and possible human factors issues"—Human Factors and Economic Aspects on Safety, p. 38—2006.

* cited by examiner

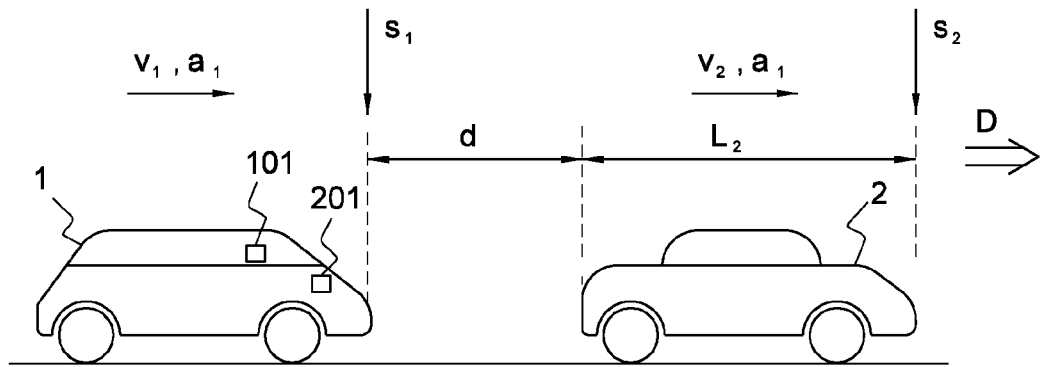
FIG. 1
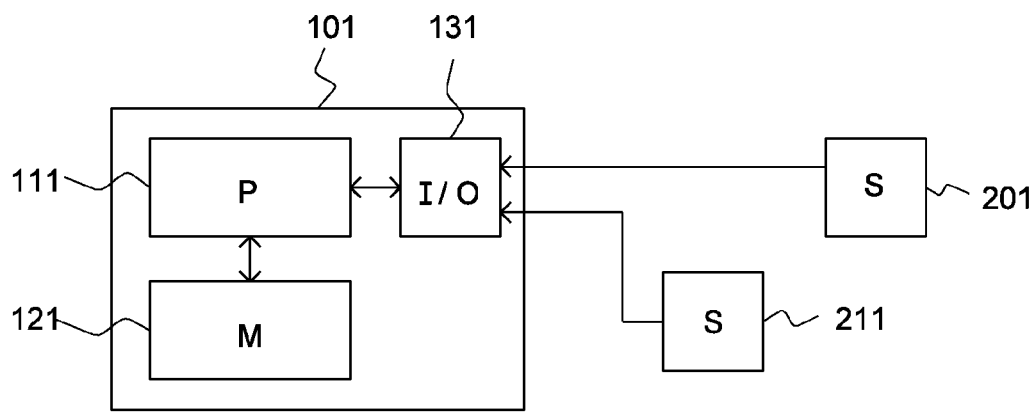
FIG. 2
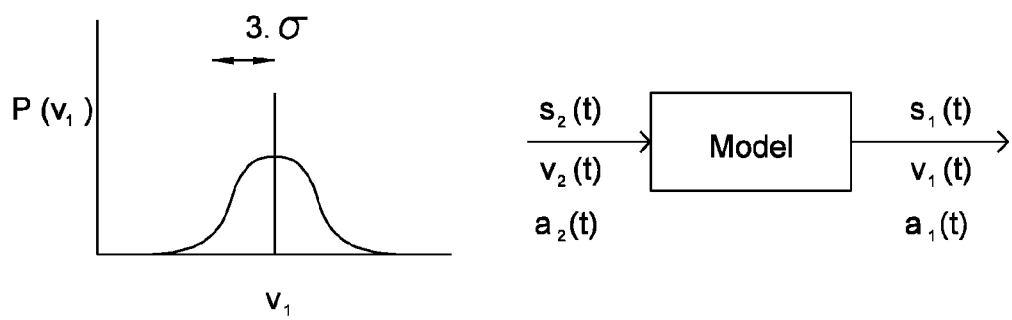
FIG. 3
FIG. 4 ial Application PCT/
VEHICLE SPACING CONTROL

CROSS-REFERENCE TO RELATED APPLICATIONS

This application is a U.S. National Stage application under 35 U.S.C. § 371 of International Application PCT/NL2013/050806 (published as WO 2014/073968 A2), filed Nov. 8, 2013, which claims priority to Application EP 12192083.9, filed Nov. 9, 2012 and Application EP 13153450.5, filed Jan. 31, 2013. Benefit of the filing date of each of these prior applications is hereby claimed. Each of these prior applications is hereby incorporated by reference in its entirety.

FIELD OF THE INVENTION

The present invention relates to vehicle control systems, a method of determining a safe spacing policy for vehicles, and a speed control unit.

BACKGROUND

The present invention relates to a method of determining a safe spacing policy for vehicles, said spacing policy preferably including a safe distance, at least a first vehicle being provided with a speed control unit for controlling the speed of the vehicle and at least one sensor unit coupled with the speed control unit for providing sensor data, such as speed, acceleration, location and/or distance data. The present invention further relates to a speed control unit for controlling the speed of a vehicle which is further provided with at least one sensor unit coupled with the speed control unit for providing sensor data. The present invention may be applied in all types of vehicles, such as ships, trains (including subways), airplanes, and road vehicles such as cars and trucks. Although the present invention is particularly useful in cooperative adaptive cruise control (CACC) systems for road vehicles, it is not so limited and may also be used in other cruise control systems or safety systems, such as non-adaptive cruise control and vehicle control systems.

Systems for assisting drivers of vehicles are well known. Reference is made to the article by A. Lindgren and F. Chen: "State of the art analysis: An overview of advanced driver assistance systems (ADAS) and possible human factors issues", in Human Factors and Economic Aspects on Safety, p. 38, 2006. Some systems alert the driver to potentially dangerous situations, such as (unintended) lane changes or braking vehicles ahead. More advanced systems directly control the vehicle, at least in emergency situations, for example by applying the brakes. CACC systems control the distance to the preceding vehicle. If the current speed of the vehicle cannot be maintained, for example because the vehicle ahead slows down, the speed is reduced so as to avoid a collision.

All these systems rely on the input of data gathered by sensors, such as speed sensors, acceleration sensors and/or position sensors (e.g. using GPS—Global Positioning System). All these sensors necessarily introduce measurement errors, however small. In addition, there are delays in the transmission of the sensor signals and in the processing of these sensor signals by the system. Further inaccuracies and hence uncertainties in the sensor data may be introduced by communication errors, such as packet losses, by sensor failure (e.g. radar or laser failure), by sensor noise and by variable delays in system components.

Any measurement errors and communication delays and/or losses result in data errors: the speed data and/or other data used in distance calculations are not completely accurate or up-to-date, thus introducing uncertainties with respect to the actual data. As a result, any spacing which is determined using these data will be inaccurate. This may be aggravated by uncertainties in braking (deceleration) parameters due to varying tyre and road conditions.

A crude solution to this problem is to introduce an error margin in the safe distance: by always adding e.g. 20% to the calculated safe distance, any measurement errors will be compensated. However, this means that the safe distance is always larger than necessary, resulting in an inefficient road use and an increased fuel consumption.

SUMMARY

It is an object of the present invention to overcome these and other problems of the Prior Art and to provide a method and device for use in vehicle control systems which has an improved reliability and offers improved safety. Accordingly, the present invention provides a method of determining a safe distance between a first vehicle and a second vehicle moving ahead of the first vehicle, each vehicle having a state which comprises a position, a speed and an acceleration of the vehicle, the method comprising the steps of:

collecting sensor data relating to the states of the vehicles, determining, using the sensor data and a time-dependent description of the state of the second vehicle, a computed state of the second vehicle which results from a maximum deceleration of said second vehicle, determining, using a time-dependent model of the behaviour of the first vehicle and said computed state of the second vehicle, a computed state of the first vehicle which results from said maximum deceleration of said second vehicle, and determining, using said computed state of the second vehicle and said computed state of the first vehicle, the safe distance, wherein said computed state of the second vehicle and said computed state of the first vehicle involve uncertainties introduced by the sensor data.

The state of each vehicle comprises the position, the speed and the acceleration of the vehicle (it is noted that an acceleration may be positive, zero or negative, and that a negative acceleration may also be called deceleration). The speed is the time derivate of the position and the acceleration is the time derivative of the speed, and conversely position is an integral of the speed and speed is an integral of the acceleration. Thus for example sensor data that represents position as a function of time can be used to determine the states of the vehicle. In this sense position as a function of time relates to the states of the vehicle. Similarly, sensor data that represents speed as a function of time can be used to determine the states of the vehicle in a coordinate frame relative to a reference position.

Explicit position, speed and acceleration values for the vehicle as a function of time describe the state explicitly dependent on time. But because speed is the time derivate of the position and the acceleration is the time derivative of the speed, position as a function of time may also be used to provide a time-dependent description of the state. The time-dependent description of the state of the second vehicle may be provided using a mathematical formula that defines position as a function of time, or equivalent explicit formulas that define position, speed and acceleration as a function of time.

A first or normal state is present during normal operation of the vehicle, while a second or emergency state occurs during an emergency brake of the second vehicle, during which the second vehicle has a maximum deceleration until standstill. For the maximum deceleration a predetermined value may be used.

Thus, using the sensor data and a time-dependent state description of the second vehicle, a computed emergency state of the second vehicle is determined. Then, using a time-dependent model of the behaviour of the first vehicle and the computed emergency state of the second vehicle, a computed emergency state of the first vehicle is determined. Finally, using the computed emergency state of the second vehicle and the computed emergency state of the first vehicle, the safe distance is determined.

The states of the first and second vehicle involve uncertainties introduced by the sensor data, in particular by inaccuracies in the sensor data. By involving uncertainties (which may be expressed as error margins) in the sensor data when determining the safe distance, any measurement errors which may be introduced by the sensor units collecting the data can be considered and a much improved estimate of a safe distance is obtained. The method of the present invention can be said to determine the uncertainty in the safe distance, based upon the uncertainties in the sensor data.

In an embodiment, said determining of the computed state of the second vehicle comprises using substitution of the sensor data by values of the position, speed and/or acceleration that have lowered by the uncertainties. The position of the second vehicle is increasingly more positive with increasing distance, and the speed and acceleration of the second vehicle are increasingly more positive when the second vehicle moves or accelerates increasingly in the direction of positive positions. Hence the substitution represents the second vehicle as closer, slower and/or having less acceleration than measured by the sensor.

The error margins, which indicate the maximum expected errors in particular data and therefore represent the uncertainties in those data, may in principle be set to an arbitrary value, but preferably the error margins are chosen to be equal to at least two times the standard deviation of the respective data, preferably three times. In particular, margins of three times the standard deviation of the particular data prove to be advantageous as they provide a very high degree of safety: the probability of the data falling outside the range determined by three times the standard deviation are very low. However, these error margins may be set to a suitable value, that is, a value providing an acceptable probability of error.

As an alternative to, or in addition to error margins, joint probability distributions may advantageously be used to model uncertainties. That is, joint probability distributions of the sensor data concerned may be produced, and the uncertainties are derived from the joint probability distributions.

In a preferred embodiment, the model comprises a convolution product of a transfer function of the first vehicle and the state of the second vehicle. That is, the behaviour of the first vehicle, in response to the maximum deceleration of the (second) vehicle ahead, is modelled as a time-dependent transfer function. As is well known in the art of vehicle control, a convolution product of a transfer function and a time-dependent function yields a new time-dependent function. The transfer function may be derived from a vehicle behaviour model in the Laplace domain or any other suitable transform domain. The time-dependent function that is convoluted with the transfer function may be a function representing position of the second vehicle as a function of time for example.

Although only distance data together with a respective standard deviation may be used, it is preferred that the data used comprise speed data, acceleration data and distance data having a speed data standard deviation, an acceleration data standard deviation and a distance data standard deviation respectively.

In a particularly advantageous embodiment the safe distance is used to determine a safe headway (also called headway time), which safe headway time is used to adjust a desired headway time if the desired headway time is smaller than the safe headway time. A headway time, which may be defined as the distance from the tip of one vehicle to the tip of the next one behind it, expressed as the time it will take for the trailing vehicle to cover that distance, is used in spacing policies to calculate safe and/or desired distances between vehicles. The headway time may be determined so as to provide so-called string stability, that is, to avoid oscillations in the vehicle speed.

In advantageous embodiments the safe distance is determined repeatedly, in real time. That is, the safe distance may be determined every second but preferably every fraction of a second, for example every 10 milliseconds (ms). This offers the advantage that the safe distance is almost instantaneously available if circumstances, such as the speed of a vehicle, change.

Although the present invention may advantageously be used in cooperative adaptive cruise control (CACC) systems, it is not so limited and may be used in other vehicle control systems, including cruise control systems and safety systems.

A speed control unit is provided for controlling the speed of a first vehicle in dependence of a second vehicle moving ahead of the first vehicle, each vehicle having a state which comprises at least one of a position, a speed and an acceleration, the speed control unit being arranged for receiving sensor data relating to the states of the vehicles from a sensor unit mounted in the first vehicle, the speed control unit comprising a memory and a processor for storing and processing said sensor data and a model of the vehicle's behaviour, the speed control unit being arranged for:

collecting sensor data relating to the states of the vehicles, determining, using the sensor data and a time-dependent description of the state of the second vehicle, a state of the second vehicle which results from a maximum deceleration of said second vehicle, determining, using a time-dependent model of the behaviour of the first vehicle and said state of the second vehicle, a state of the first vehicle which results from said maximum deceleration of said second vehicle, and determining, using said state of the second vehicle and said state of the first vehicle, the safe distance, wherein said state of the second vehicle and said state of the first vehicle involve uncertainties introduced by the sensor data.

Again, by involving the uncertainties introduced by the sensor data in the determination of the safe distance, the safe distance is adjusted in accordance with these error margins and a more reliable safe distance is obtained. As discussed before, the uncertainties introduced by the sensor data may be due to measurement errors, communication delays, communication failures and/or other factors.

Additionally a computer program product is provided for carrying out the method defined above. A computer program product may comprise a set of computer executable instructions stored on a tangible data carrier, such as a CD, a DVD or a USB memory stick. The set of computer executable instructions, which allow a programmable computer to carry out the method as defined above, may also be available for downloading from a remote server, for example via the Internet.

BRIEF DESCRIPTION OF THE DRAWING

These and other aspects will further be described below with reference to exemplary embodiments illustrated in the accompanying drawings, in which:

FIG. 1 schematically shows, by way of example, road vehicles driving in the same direction.

FIG. 2 schematically shows a vehicle control system.

FIG. 3 schematically shows uncertainties in sensor data used in the vehicle control system of FIG. 1.

FIG. 4 schematically shows how a model is used to derive the state of the first vehicle from the state of the second vehicle.

DESCRIPTION OF EXEMPLARY EMBODIMENTS

The cars schematically shown in FIG. 1 drive in the same direction D. The first vehicle (car) 1, provided with a speed control unit 101 and a sensor unit 201, is driving behind the second vehicle (car) 2, which may or may not be provided with a speed control unit. A distance d is measured between the front end of the first car 1 and the rear end of the second car 2, while the second car 2 has a length $L_2$. Each car has an instantaneous position $s_1$ and $s_2$ (measured, for example, at the front end of each vehicle), speed (e.g. $v_1$ and $v_2$), and acceleration (e.g. $a_1$ and $a_2$) respectively. In an embodiment, the position, speed and acceleration (and possibly other factors) together constitute the state of a vehicle. From time dependent position information a state including speed and an acceleration follows implicitly, and similarly from a time dependent speed, acceleration and position relative to a reference follow implicitly etc. Each vehicle may brake; the minimum distance required to come to a standstill is the respective braking distance, which may differ between the vehicles.

It will be understood that more cars may be driving in the same direction, or even in opposite directions, but for the sake of clarity an explanation will be given with reference to the two-car example of FIG. 1. It will also be understood that instead of cars driving on a road, trains or other rail vehicles driving on a track and even air-borne transportation devices will benefit from the present invention.

The sensor unit 201 mounted in the first vehicle 1 is configured for collecting data relating to the states of both the first vehicle 1 and the second vehicle 2 and sending those sensor data to the speed control unit 101. More in particular, the data collected by the sensor unit 201 may include speed data produced by a speedometer (e.g. linked to the vehicle's transmission), acceleration data produced by acceleration sensors, distance data produced by a radar unit, and location data produced by a GPS (Global Positioning System) unit. A radar unit may also provide data relating to the relative velocity of the vehicles. The various data producing units are not necessarily accommodated in the housing of the sensor unit 201.

All data sources are prone to errors. These errors include measurement errors, which are caused by a lack of accuracy. Other errors may be introduced by the transmission of data from one unit to another, for example by Wi-Fi, that is, by a wireless local area network (WLAN). When using Wi-Fi, data are transmitted in data packets which are sometimes lost, resulting in both a data loss and a delay in the arrival of fresh data. This transmission delay can be crucial in cases of emergency, for example when the vehicles are braking hard. It is an aim to take data loss and/or data errors into account.

The vehicle control system 10 shown merely by way of non-limiting example in FIG. 2 comprises a speed control unit 101, a sensor (S) units 201 to 211, a position determination (GPS) unit 230 and a communication (Com.) unit 240. The speed control unit 101 comprises a processor (P) unit 111, a memory (M) unit 121 and an input/output (I/O) unit 131. As the speed control unit 101 may be configured for other tasks in addition to speed control, it may also be referred to as vehicle control unit.

The sensor units 201 to 211 are coupled to the I/O unit 131 of the speed control unit 101 by wired or wireless connections. The sensor unit 201 may comprise a distance sensor, for example a distance sensor using radar. A radar-based distance sensor may also be able to determine a relative velocity: the velocity of the first vehicle 1 relative to the second vehicle 2. The sensor unit 211 may comprise a speed sensor, for example a speed sensor coupled to a wheel of the vehicle. Further sensors and/or sensor units may be provided, for example acceleration sensors, location sensors based upon mobile (that is, cellular) telephone networks, and other sensors.

The position determination unit 230 may be based on GPS (Global Positioning System), providing the location of the vehicle as a function of time. The vehicle unit 101 may be arranged for deriving the vehicle speed from the time-dependent location provided by the position determination unit 230.

The communication unit 240 is preferably arranged for communication with other vehicles in order to transmit and receive vehicle data including, for example, the speed and/or the acceleration of the vehicle.

The processor unit 111 is, in combination with the memory unit 121, configured for using a time-dependent description of the position $s_2$ of the second vehicle 2 (see FIG. 1). More in particular, this description describes the position of the second vehicle in a worst-case situation: an emergency brake. Expressed mathematically, such a description may be given by:

$$s_2 = s_{t0} + v_{t0} \cdot t + \tfrac{1}{2} a_{t0} \cdot t^2 - \text{tau}(a_{max} - a_{t0}) + (\tfrac{1}{2} t^2 - \text{tau}^2 \cdot \exp(-t/\text{tau})) \cdot (a_{max} - a_{max} - a_{t0}) \qquad (I)$$

where:
$s_{t0}$=the location of the second vehicle at $t_0$,
$v_{t0}$=the speed of the second vehicle at $t_0$,
$a_{t0}$=the acceleration of the second vehicle at $t_0$,
$t_0$=the reference point in time (t=0),
tau (=τ)=the time constant of the second vehicle,
$a_{max}$=the maximum acceleration/deceleration of the second vehicle.

The maximum deceleration is a value that expresses deceleration in the case of the emergency brake, i.e. the worst-case situation. As the worst case situation is a hypothetical case, a predetermined value may be used. The method and system will work with any value, but to ensure safety when the method and system are used, a predetermined value may be selected that represent an expected deceleration of a representative vehicle during emergency brake, or a maximum of deceleration values for different representative vehicles during emergency brake.

This description provides the position $s_2$ of the second vehicle 2 as a function of time "t" and is determined by the above-mentioned parameters, some of which (such as $s_{t0}$, $v_{t0}$ and $a_{t0}$) are provided by sensor data and will necessarily include errors.

The error margins of the sensor data are taken into account. That is, in equation (I) the following substitution are made:

$s_{t0} \rightarrow d_0 - e_d$, where $e_d$ is the distance error margin;
$v_{t0} \rightarrow v_{t0} - e_v$, where $e_v$ is the velocity error margin; and
$a_{t0} \rightarrow a_{t0} - e_a$, where $e_a$ is the acceleration error margin.

It is noted that the initial position $s_{t0}$ of the second vehicle is now substituted with the initial distance $(d_0 - e_d)$ between the two vehicles, the initial position of the first vehicle being chosen to be equal to zero for the sake of convenience. Although preferably all of the sensed position, velocity and acceleration are substituted, it should be noted that substitution of only one or two of the position, velocity and acceleration may produce substantially the same result if the error margin in the others or other are insignificant. Moreover, an improvement is achieved in any case when at least one of sensed position, velocity and acceleration is substituted.

By using a parameter, such as an initial speed, from which the error margin is subtracted, the probability of measurement errors resulting in a value of the safe distance which it too small, and which may therefore result in a collision, is significantly reduced.

Instead of, or in addition to the above way of involving uncertainties in the calculations of the safe distance, joint probability density functions may be used. A joint probability density functions expresses the probability density of state values, i.e. for any range of state values it defines the probability that the actual state value is in that range. A time dependent probability density function may be used that expresses such a probability density for a plurality of time points.

Joint probability density functions may be used that represent the probability density of a current position, speed and/or acceleration given the sensor data, the probability density accounting for probability of different current position, speed and/or acceleration given the sensor data. In an embodiment the probability density functions for the time of capturing the sensor data may be Gaussian, the Gaussian functions being centred at values determined from the sensor data and the Gaussian having a variance according to the error margins. When more than one of the current position, speed and/or acceleration is determined based on the same sensor data, correlation between the errors may arise. In this case, a probability density function for the sensor data may be used, and a probability density for the position, speed and/or acceleration may be obtained by Bayesian techniques, using an expression for the conditional probability of sensor data values given the position, speed and/or acceleration, i.e. effectively by inserting inverted expressions for the sensor data as a function of the position, speed and/or acceleration in the probability density function for the sensor data.

Of course the probability of errors is further reduced as the error margins are increased. However, choosing error margins which are too large will result in unnecessarily large distances between the vehicles, and hence in inefficient road use and possibly increased fuel consumption. According to a further aspect, however, the maximum error margin is chosen to be equal to three times the standard deviation of the particular parameter, as illustrated in FIG. 3 where the probability $P(v_1)$ of the velocity having the value $v_1$ is shown. So in equation (I) the following parameters can be used:

$s_{t0} \rightarrow d_0 - 3 \cdot \text{sigma}_d$, where $\text{sigma}_d$ ($\sigma_d$) is the standard variation of the distance;
$v_{t0} \rightarrow v_{t0} - 3 \cdot \text{sigma}_v$, where $\text{sigma}_v$ ($\sigma_v$) is the standard variation of the velocity; and
$a_{t0} \rightarrow a_{t0} - 3 \cdot \text{sigma}_a$, where $\text{sigma}_a$ ($\sigma_a$) is the standard variation of the acceleration.

Using these parameters, equation (I) now describes the position of the second vehicle 2 in case of an emergency braking situation while taking the sensor data errors into account. As a result, the calculated position of the second vehicle will be closer to the first vehicle than without these substitutions, thus reducing the safe distance. The resulting s2 value may be used to determine a headway distance h from the first vehicle to the second vehicle.

It is noted that instead of, or in addition to the standard deviation used above, joint probability distributions of the parameters (e.g. s, v and a) can be used. In that case, for example a position value s2 for the second vehicle when emergency braking can be derived from the joint probability distribution. For example, a position value s2 for a time "t" may be used for which the probability density function predicts that the probability of any worse value is below a predetermined threshold Pmin. For example, when a joint probability density function P is used that represent the probability density of actual position, speed and/or acceleration given the sensor data at a future time "t", the position value "s2" may be determined as a position argument value s=s2 of the probability density function P(s, . . . ; t) of the second vehicle at closest distance to the first vehicle for which it holds true that for the time "t" the cumulated probability density w(s<s2) (an integral of the probability density) of positions "s" of the second vehicle closer to the first vehicle than that position value s2 is not higher than a predetermined threshold Pmin: w(s<s2)<=Pmin. The resulting s2 may be used to determine a headway distance h from the first vehicle to the second vehicle.

At least the position dependent of the joint probability density function at a future time may be computed from the joint probability density functions at the time of capturing the sensor data ("the initial time") using the expression for the state at the future time as a function of the state at the initial time. This may be done for example by Bayesian techniques, using an expression for the conditional probability of a state at a future time given the state at the current time. Effectively, an inverse expression for the state at the initial time as a function of the state (e.g. position) at the future time, is inserted into the probability density function for the current time. Alternatively, the joint probability density functions at the future time may be computed by Monte Carlo methods, by sampling states with a probability according to the probability density function at the initial time and computing the corresponding states for the future time.

In order to determine the actual safe distance, the behaviour of the first vehicle (1 in FIG. 1) has to be taken into account. A model is used which involves both the behaviour of the first vehicle itself and the behaviour of the speed control unit, including a communication delay. It is preferred that this combined behaviour is modelled in the Laplace domain, thus using a well-known engineering technique. It has been found that a suitable Laplace domain transfer function representing a realistic model is given by:

$$Z(s)=\exp(-\theta s)/(hs+1) \qquad (II),$$

where theta ($\theta$) is a time delay, h is the (current) headway time and s the Laplace domain variable. Transformed to the time domain, this model can be expressed as:

$$Z(t)=(1/h).\exp(-(t-\theta)/h) \qquad (III)$$

The position $s_1$ of the first vehicle 1 can now be expressed as:

$$s_1(t)=Z(t)*s_2(t) \qquad (IV)$$

where "*" denotes the convolution operation. As may be noted, this formula expresses the position s1 of the first vehicle in terms of the time dependent position s2 of the second vehicle. Herein the time-dependent description of the position s2 of formula I may be used.

The safe distance $d_{safe}$ between the vehicles is finally given by:

$$d_{safe}=s_2(T_2)-s_1(T_1)-L_2 \qquad (V)$$

where $T_1$ and $T_2$ are the times at which the first vehicle and the second vehicle respectively reach standstill, and where $L_2$ again is the length of the second vehicle (as its position is measured from its front).

The safe distance $d_{safe}$ can be determined repeatedly, for example at least once every second but preferably more frequently, to check whether the actual distance between the vehicles is still at least as large as the safe distance. As will be clear from the explanation above, the safe distance is time-dependent and further depends on several parameters, such as the actual speed of the vehicles.

In summary, the speed control unit 101 is configured for:
  determining, using the sensor data and a time-dependent description of the normal state of the second vehicle 2, a state of the second vehicle which results from a maximum deceleration of the second vehicle,
  determining, using a time-dependent model of the behaviour of the first vehicle 1 and the normal state of the second vehicle, a state of the first vehicle which results from said maximum deceleration of said second vehicle, and
  determining, using the maximum deceleration state of the second vehicle and the maximum deceleration state of the first vehicle, the safe distance,
while using error margins of the sensor data to determine the safe distance.

A spacing policy is designed to reach and/or maintain a certain reference value, such as a desired distance. Such a desired distance $d_{desired}$ relative to a preceding vehicle (the second vehicle 2 in FIG. 1) may be expressed as:

$$d_{desired}=r+h.v_1 \qquad (VI)$$

where r is the distance between the vehicles at standstill, h is the desired headway time determined by the spacing policy (which prescribes a suitable spacing between vehicles) and $v_1$ is the speed of the vehicle in question (the first vehicle 1 in FIG. 1). It is noted that $d_0=r+h.v_1+n$, where n is a noise component.

The safe distance $d_{safe}$ can advantageously be used to determine a safe headway time $h_{safe}$:

$$h_{safe}=(d_{safe}-r)/v_1 \qquad (VII)$$

This involves the insight that input data produced by sensors, such as speed data and acceleration data, necessarily contain measurement errors, which result in uncertainties. By taking these measurement and system errors (e.g. delays) into account, a much more reliable safe vehicle distance (and hence a safe headway time) can be determined. A further insight is that an inaccuracy modelled by e.g. three times the standard deviation gives a very reliable estimate of the error, and hence of the safe distance. However, joint probability distributions are also advantageous when modelling the uncertainties.

It is noted that any terms used in this document should not be construed so as to limit the scope of the present invention. In particular, the words "comprise(s)" and "comprising" are not meant to exclude any elements not specifically stated. Single elements may be substituted with multiple elements or with their equivalents. Although the invention has been described with reference to on-board vehicle control systems, the invention is not so limited and may also be applied in remote vehicle control system. As stated before, the term vehicles is not limited to road vehicles such as cars and trucks but also includes ships, rail vehicles, airplanes, helicopters and other means of transportation. The term acceleration is not limited to positive acceleration but may also refer to negative acceleration, that is, deceleration. The terms speed and velocity are interchangeable. Similarly, in most cases the terms location and position are interchangeable.

It will therefore be understood by those skilled in the art that the present invention is not limited to the embodiments illustrated above and that many modifications and additions may be made without departing from the scope of the invention as defined in the appending claims.

The invention claimed is:

1. A vehicle distance control method, executed by a vehicle control system, the method comprising determining a safe distance ($d_{safe}$) between a first vehicle and a second vehicle moving ahead of the first vehicle, each vehicle having a state which comprises a position ($s_1$, $s_2$), a speed ($v_1$, $v_2$) and an acceleration ($a_1$, $a_2$) of the vehicle, the method comprising the steps of:
  the vehicle control system collecting sensor data relating to the states of the vehicles,
  the vehicle control system determining, using the sensor data and a time-dependent description of the state of the second vehicle, a computed state of the second vehicle which results from using a maximum deceleration value for said second vehicle,
  the vehicle control system determining, using a time-dependent model of the behavior of the first vehicle and said computed state of the second vehicle, a computed state of the first vehicle which results from using said maximum deceleration value for said second vehicle, and
  the vehicle control system determining, using said computed state of the second vehicle and said computed state of the first vehicle, the safe distance ($d_{safe}$),
  the vehicle control system activating a brake of the first vehicle for controlling a speed of the first vehicle on the basis of the safe distance if an actual distance is smaller than the safe distance, wherein the safe distance is determined repeatedly in real time, using said sensor data for said position ($s_2$), speed ($v_2$) and acceleration ($a_2$) of said second vehicle, and wherein one or more of $s_2$, $v_2$, and $a_2$ is evaluated, in determining $d_{safe}$, based on its actual value and additionally accounting for uncertainties introduced into the sensor data by measurement errors of the sensors, communication delays and/or communication losses.

2. The method according to claim 1, wherein the uncertainties are modeled by the standard deviation (sigma) of the respective data, preferably three times the standard deviation (sigma).

3. The method according to claim 1, wherein sensor data for the position, speed and/or acceleration lowered by the uncertainties are substituted in said determining of the computed state of the second vehicle.

4. The method according to claim 1, wherein the uncertainties are modeled using joint probability density functions.

5. The method according to claim 1, wherein the model comprises a temporal convolution product of a temporal transfer function of the first vehicle and the computed state of the second vehicle as a function of time.

6. The method according to claim 1, wherein the sensor data comprise speed data, acceleration data and distance data, the distance data preferably being derived from position data, and wherein the speed data, acceleration data and distance data preferably have a speed data standard deviation ($sigma_s$), an acceleration data standard deviation ($sigma_a$) and a distance data standard deviation ($sigma_d$) respectively.

7. The method according to claim 1, wherein the safe distance ($d_{safe}$) is used to determine a safe value of the headway time ($h_{safe}$), the headway time being defined as the time it will take for the second vehicle to cover a distance from the tip of the second vehicle to the tip of the first vehicle, which safe value of the headway time is used to adjust a desired headway time ($h_{des}$) if the desired headway time is greater than the safe value of the headway time.

8. The method according to claim 1, wherein the safe distance ($d_{safe}$) is determined at least once a second.

9. The method according to claim 1, used in a cooperative adaptive cruise control system.

10. A computer program product for carrying out the method according to claim 1.

11. The method according to claim 1, wherein the uncertainties are modeled by the standard deviation (sigma) of the respective data, preferably three times the standard deviation (sigma).

12. The method according to claim 1, wherein sensor data for the position, speed and/or acceleration lowered by the uncertainties are substituted in said determining of the computed state of the second vehicle.

13. The method according to claim 1, wherein the uncertainties are modeled using joint probability density functions.

14. A speed control unit for controlling the speed of a first vehicle in dependence of a second vehicle moving ahead of the first vehicle, each vehicle having a state which comprises a position ($s_1$, $s_2$), a speed and an acceleration of the vehicle,
the speed control unit being arranged for receiving sensor data relating to the states of the vehicles from a sensor unit mounted in the first vehicle,
the speed control unit comprising a memory and a processor for storing and processing said sensor data and a model of the vehicle's behavior, the speed control unit being arranged for:
determining, using the sensor data and a time-dependent description of the state of the second vehicle, a computed state of the second vehicle which results from using a maximum deceleration value for said second vehicle,
determining, using a time-dependent model of the behavior of the first vehicle and said computed state of the second vehicle, a computed state of the first vehicle which results from using said maximum deceleration value for said second vehicle, and
determining, using said computed state of the second vehicle and said computed state of the first vehicle, the safe distance ($d_{safe}$),
the speed control unit activating a brake of the first vehicle for controlling a speed of the first vehicle on the basis of the safe distance if an actual distance is smaller than the safe distance, wherein the safe distance is determined repeatedly in real time, using said sensor data for said position ($s_2$) of said second vehicle, and wherein $s_2$ is evaluated, in determining $d_{safe}$, based on its actual value and additionally accounting for
uncertainties introduced into the sensor data by measurement errors of the sensors, communication delays and/or communication losses.

15. The speed control unit according to claim 14, wherein the uncertainties are modelled by the standard deviation (sigma) of the respective data, preferably three times the standard deviation (sigma).

16. The method according to claim 14, wherein the uncertainties are modelled using joint probability density functions.

17. The speed control unit according to claim 14, which speed control unit is an adaptive speed control unit, preferably suitable for use in a cooperative adaptive cruise control system.

18. A system for vehicle control, comprising a speed control unit according to claim 14.

19. A vehicle distance control method, executed by a vehicle control system, the method comprising determining a safe distance ($d_{safe}$) between a first vehicle and a second vehicle moving ahead of the first vehicle, each vehicle having a state which comprises a position ($s_1$, $s_2$), a speed ($v_1$, $v_2$) and an acceleration ($a_1$, $a_2$) of the vehicle, the method comprising the steps of:
the vehicle control system collecting sensor data relating to the states of the vehicles,
the vehicle control system determining, using the sensor data and a time-dependent description of the state of the second vehicle, a computed state of the second vehicle which results from using a maximum deceleration value for said second vehicle,
the vehicle control system determining, using a time-dependent model of the behavior of the first vehicle and said computed state of the second vehicle, a computed state of the first vehicle which results from using said maximum deceleration value for said second vehicle, and
the vehicle control system determining, using said computed state of the second vehicle and said computed state of the first vehicle, the safe distance ($d_{safe}$),
the vehicle control system activating a brake of the first vehicle on the basis of the safe distance if an actual distance is smaller than the safe distance,
wherein said computed state of the second vehicle and said computed state of the first vehicle involve uncertainties introduced into the sensor data by measurement errors of the sensors, communication delays and/or communication losses.

20. A speed control unit for controlling the speed of a first vehicle in dependence of a second vehicle moving ahead of the first vehicle, each vehicle having a state which comprises a position ($s_1$, $s_2$), a speed and an acceleration of the vehicle,
the speed control unit being arranged for receiving sensor data relating to the states of the vehicles from a sensor unit mounted in the first vehicle, the speed control unit comprising a memory and a processor for storing and processing said sensor data and a model of the vehicle's behavior, the speed control unit being arranged for:

determining, using the sensor data and a time-dependent description of the state of the second vehicle, a computed state of the second vehicle which results from using a maximum deceleration value for said second vehicle, determining, using a time-dependent model of the behavior of the first vehicle and said computed state of the second vehicle, a computed state of the first vehicle which results from using said maximum deceleration value for said second vehicle, and determining, using said computed state of the second vehicle and said computed state of the first vehicle, the safe distance ($d_{safe}$), the speed control unit activating a brake of the first vehicle on the basis of the safe distance if an actual distance is smaller than the safe distance, wherein said computed state of the second vehicle and said computed state of the first vehicle involve uncertainties introduced into the sensor data by measurement errors of the sensors, communication delays and/or communication losses.

* * * * *